United States Patent [19]
Mueller

[11] 3,820,558
[45] June 28, 1974

[54] COMBINATION VALVE
[75] Inventor: Erwin R. Mueller, Milwaukee, Wis.
[73] Assignee: Rex Chainbelt Inc., Milwaukee, Wis.
[22] Filed: Jan. 11, 1973
[21] Appl. No.: 322,791

[52] U.S. Cl................. 137/269, 137/270, 137/501, 251/356, 251/367
[51] Int. Cl.......................... F16k 1/44, F16k 51/00
[58] Field of Search.................. 137/269, 270, 501; 251/367, 356

[56] References Cited
UNITED STATES PATENTS
3,593,742  7/1971  Taylor............................ 137/269 X
3,613,715  10/1971  Johnson............................ 137/269

Primary Examiner—Henry T. Klinksiek
Assistant Examiner—Robert J. Miller
Attorney, Agent, or Firm—Kinzer, Plyer, Dorn & McEachran

[57] ABSTRACT

This is a combination valve primarily usable with high pressure water and other low viscosity fluids for both pressure and directional control applications and may be used as a relief valve, a pressure-reducing valve or an unloading valve.

15 Claims, 13 Drawing Figures

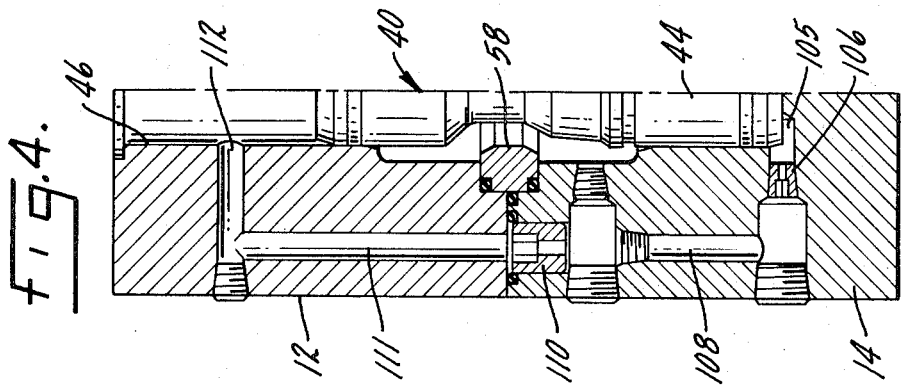
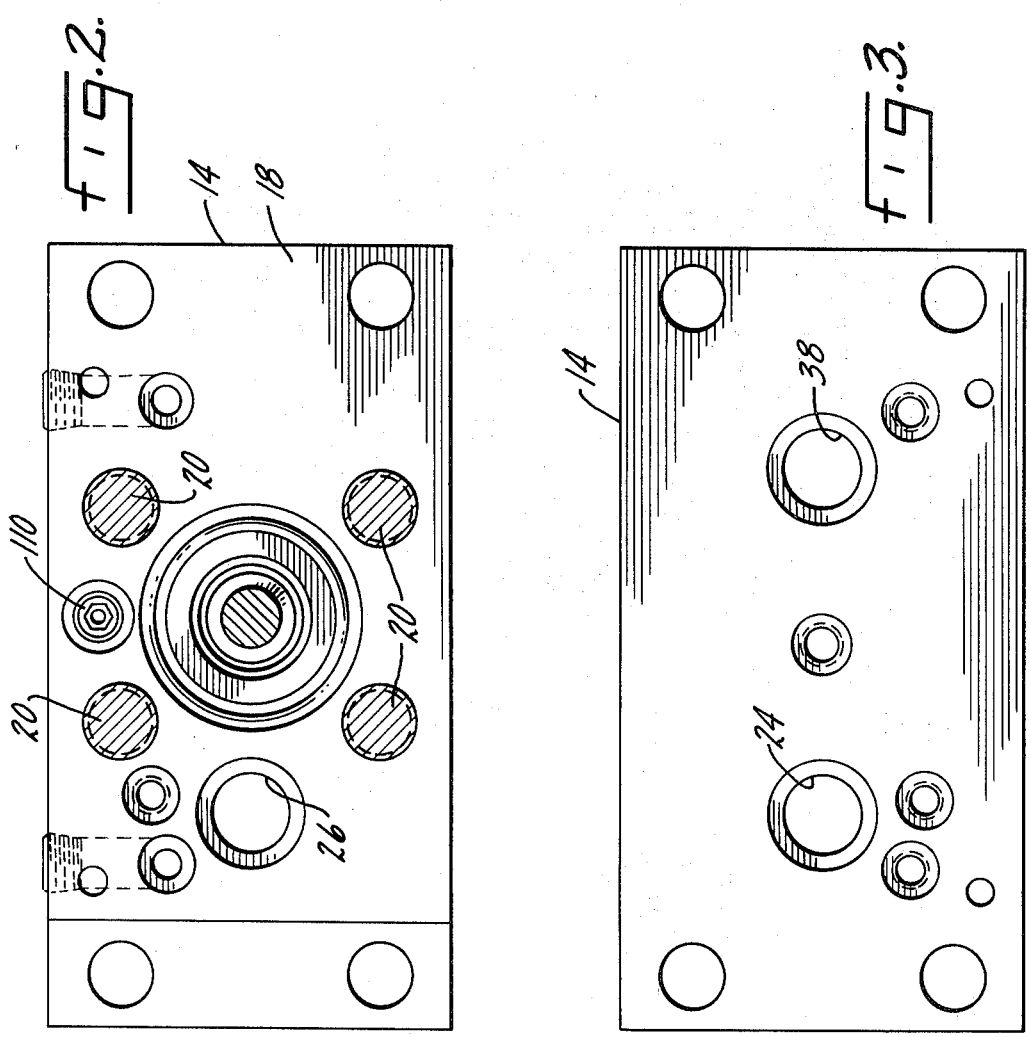

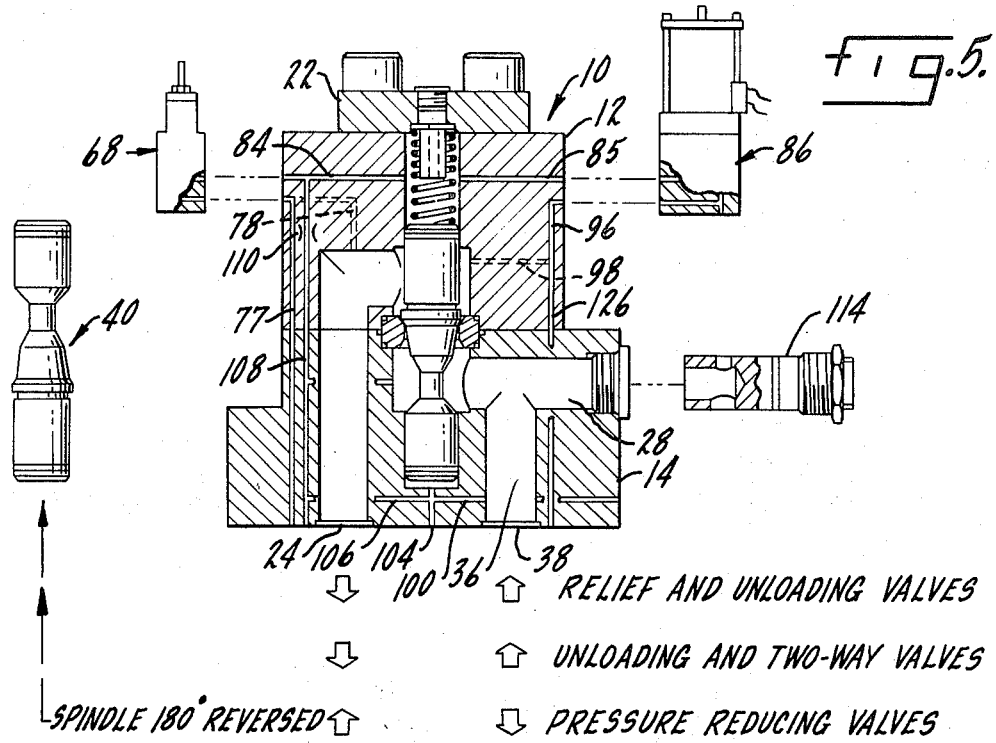

⇩ RELIEF AND UNLOADING VALVES
⇧ UNLOADING AND TWO-WAY VALVES
⇩ PRESSURE REDUCING VALVES
SPINDLE 180° REVERSED ⇧

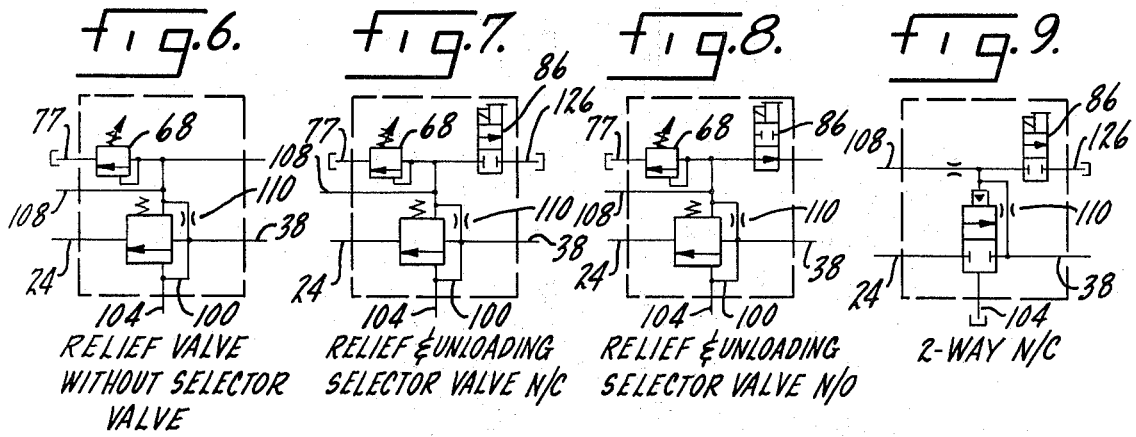

fig.6. RELIEF VALVE WITHOUT SELECTOR VALVE
fig.7. RELIEF & UNLOADING SELECTOR VALVE N/C
fig.8. RELIEF & UNLOADING SELECTOR VALVE N/O
fig.9. 2-WAY N/C

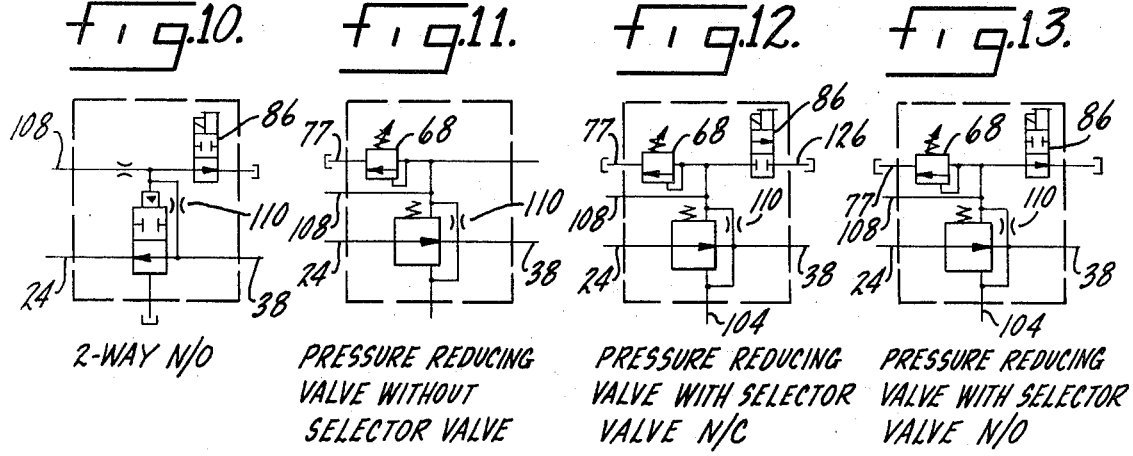

fig.10. 2-WAY N/O
fig.11. PRESSURE REDUCING VALVE WITHOUT SELECTOR VALVE
fig.12. PRESSURE REDUCING VALVE WITH SELECTOR VALVE N/C
fig.13. PRESSURE REDUCING VALVE WITH SELECTOR VALVE N/O 3,820,558

COMBINATION VALVE

SUMMARY OF THE INVENTION

This invention is concerned with a combination valve primarily intended to be used as a high pressure valve useable with water and other low viscosity fluids or heavier viscosity fluids such as oil.

A primary object of the invention is a valve structure which enables the valve, with certain minor modifications, to be used as a relief valve, a pressure-reducing valve or an unloading valve.

Another object is a valve of the above type with one common body housing.

Another object is a valve of the above type with a particular body configuration with two halves bolted or otherwise connected together at the horizontal centerline of the seat that does away with the requirements for any sleeves, shrink fits, or other external means of retaining the seat in place.

Another object is a valve of the above general type with a spool, spindle, poppet or whatever valving element that has a unique shape or profile so that it will function as a pressure-reducing valve in one position and may be inverted 180° and will function as a pressure relief valve.

Another object is a valve of the above type in which the valving element has a profile or curvature that is developed in a way such that it automatically provides the correct orifice required for the set pressure reductions.

Another object is a valve body configuration wherein a series of passages have been developed so that properly selecting and applying certain attachments, such as an adjustable pilot relief and a solenoid selector valve, the valve body may be used as the main stage in pressure relief or reducing or as a two way valve without disturbing the basic valve structure.

Another object is a valve body of the above type in which the attachments mentioned above are connected to the valve body by means of tubing and connectors so that the valve will carry out the functions of pressure relief, reducing, unloading from some remote control without disturbing the basic valve body structure.

Another object is a valve body of the above type in which the under surface is constructed and arranged so that it may be manifold mounted or attached by flanges permitting an in-line connection.

Another object is a valve of the above type constructed specifically to be used as a pressure-reducing valve with a variable orifice restrictor in series with the valve spool so that the restriction creates a predetermined proportion of the total pressure drop.

Another object is a pressure-reducing valve of the above type in which the restrictor is in the form of an insert which may be removed and replaced and adjusted from outside the valve body.

Other objects will appear from time to time in the ensuing specification and drawings.

BRIEF DESCRIPTION OF THE DRAWINGS

FIG. 2 is a section along line 2—2 of FIG. 1;
FIG. 3 is a bottom view of a part of FIG. 1;
FIG. 4 is a section along 4—4 of FIG. 1;
FIG. 5 is a schematic of the valve structure, somewhat exploded;
and
FIGS. 6–13 are diagrammatics of various valve functions.

DESCRIPTION OF THE PREFERRED EMBODIMENT

Figure 1:
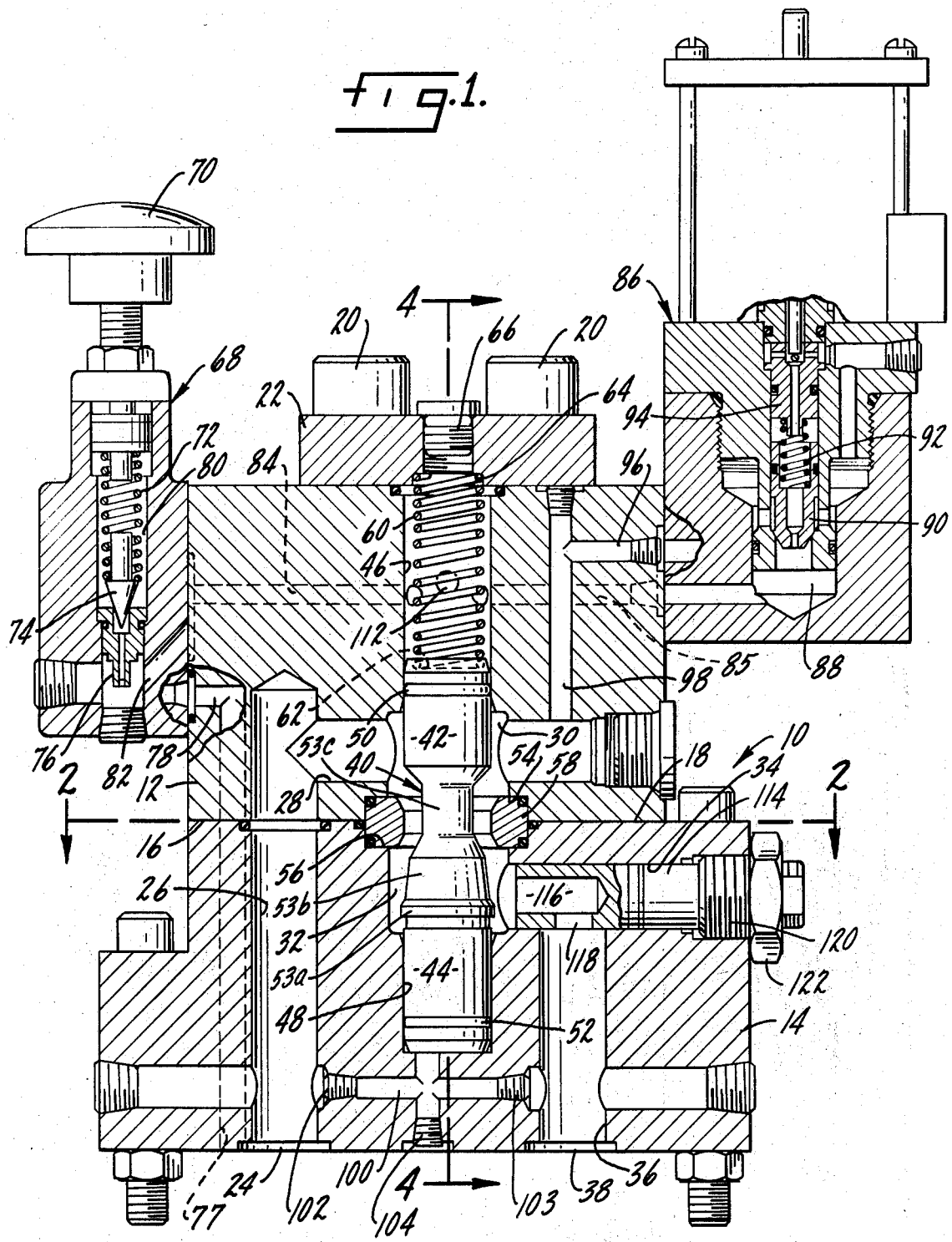
FIG. 1 is a side view, mostly in section.

In FIG. 1 the valve housing is indicated generally at 10 and includes upper and lower halves 12 and 14 which, admittedly, are not exact halves but will be referred to as such for convenience. Their abutting surfaces 16 and 18 are held together by a plurality of bolts 20, shown in this case as 4, which pass through an upper plate 22, through the upper half 12, and may be threaded into the lower half 14.

The lower half 14 has what shall be referred to as an inlet port 24 and a main inlet channel 26 leading to a cross channel 28 which in turn leads into the main valve chamber, which may include an upper chamber 30 in the upper valve half 12 and a lower chamber 32 in the lower half 14 which, through a cross channel 34, leads into a discharge channel 36 with an outlet port 38.

The main valve chamber has a valve spool or spindle, indicated generally at 40, with a particular valve configuration or profile between upper and lower piston portions 42 and 44, each of which fits in a cylinder 46 and 48 in their respective housing halves with glass filled Teflon piston ring assemblies 50 and 52. The piston portions 42 and 44 have the same diameter as do the cylinders 46 and 48 so that the spool or spindle may be reversed 180° and used to change the function of the valve structure, as explained in detail hereinafter in connection with FIG. 5.

The spindle itself has a seat chamfer 53a adjacent one of the piston portions, in this case the one designated 44, with a relief between the two to facilitate manufacture. Next to the seat chamfer is a taper part 53b which should be a series of curves but for ease of manufacture is made as a straight taper. The taper part 53b cooperates with the orifice or hole through the valve ring to control flow both when the valve is being used as a relief valve and also as a pressure-reducing valve. Next is the smallest diameter 53c which has lead-in tapers on each side. When the valve is being used as a relief valve in the position shown in FIG. 5, the seat chamfer 53a will engage the seat or ring until a predetermined pressure is reached. When it is being used as a reducing valve, the spindle will be reversed, in the removed position of FIG. 5, and the seat chamfer 53a will normally not engage the seat except possibly under unusual operating conditions. In either case the taper part 53a is basically the controlling surface.

The valve chamber halves 30 and 32 are counterbored at the abutting surfaces, as at 54 and 56, to provide an offset or annular seat or socket for a valve ring 58, the throat of which is profiled at either end so as to provide a sealing face with the valve element thus giving positive shut-off in any of the various functions set forth hereinafter, suitable O-ring seals being provided at the corners of the valve ring in the usual manner. The opposed annular seats 54 and 56 opening into the abutting surfaces 16 and 18 of the housing halves have the advantage that the valve ring itself 58 will pilot the two halves together since the various cylinders, chambers, channels and seats holding the spindle or spool may all be drilled, reamed, lapped, and what-have-you in the same machine tool setup which will insure, for example, the exact alignment and concentricity of the two cylinder surfaces 46 and 48 when the two halves are assembled with the valve ring 58 between them.

A light spring 60 is provided above the spindle or spool with its lower end fitted in a socket 62 on the top of the spool and its upper end in an offset 64 in the top plate 22 with a remote vent or gauge connection 66 being provided at the top and closed, as shown, by a suitable plug.

An adjustable pilot relief valve 68 may be attached to the side of the upper half by any suitable means, not shown, such as bolts or the like. The details of the pilot relief may be conventional and, as shown, it has a suitable hand screw 70 varying the pressure of spring 72 on a valve element 74 against a seat 76 so as to control the flow therethrough. A pilot passage 77 in the upper valve half 12 may communicate with an external drain through a cross passage 78 and a vertical passage arrangement not shown in FIG. 1, may bring fluid to the chamber 80 above the valve seat 76 with the lower side of the valve seat 76 being connected through a side passage 82 to a cross pilot line 84 which opens into chamber 46 and then, through a passage 85, leads to a solenoid controlled pilot selector valve 86 which in detail may also be old with sufficient parts thereof being shown to explain its operation. Pilot passage 85 leads into the lower chamber 88 with the valve seat being controlled by a valve element 90 through a spring 92 to a solenoid-operated plunger 94 to the upper side of the valve element which is in communication with a cross pilot passage 96 which, through a vertical passage 98, opens into the cross chamber passage 28.

Cross passages 100 below the spool or valve element communicate cylinder chamber 48 below the piston portion 44 with the inlet passage 26 with the left end being capable of being plugged at 102. The right end 103 of passage 100 is also capable of being plugged with a bottom outlet 104 also capable of being plugged. A second passage 105 in FIG. 4 also connects below piston portion 44 and, through a restriction or orifice 106, connects with a vertical series of passages 108 extending up through the side of the housing halves with a second insertable restriction or orifice 110 at the parting line. The upper end 111 of the side passages connect above the spool or spindle by cross passage 112.

In FIG. 1 a restrictor 114 is shown inserted in cross passage 34 and may take the form of a tubular insert with an axial passage 116 at the front end and one or more side openings 118 to provide communication between the valve chambers and the outlet passage 36, with the insert being screw-threaded, at 120, in place so that it may be adjusted and held in any selected position, for example, by a nut 122 or the like.

The spool 40 works in conjunction with the valve seat 58. This seat has two sealing faces at each of a tubular bore. Only one sealing face is used at any single time and is dependent on the function of the valve. In any relieving or reducing operation, the fluid flow is controlled by the amount of annular area between the spool and the tubular bore in the valve seat. The diameter of the bore is constant, but because of the curvature, or profile of the spool operating inside the seat bore, a change in annular area will occur whenever the spool moves relative to the seat which is fixed. This curvature or profile of the spool is machined in such a way that movement of the spool is very nearly linear. To achieve true linearity, the profile has to be parabolic and the flow through the vavle has to be constant for that particular parabolic curve. In practice, flows through the valve will vary from one system to another, and consequently, a number of curves have been superimposed on top of each other, and a composite profile resolved which approximates all requirements.

During reducing operations as in FIG. 1, the spool moves relative to the seat, depending on flow capacity and pressure reduction requirements. Because of the profile of the spool, the vertical force components also vary as the spool moves up and down, and, as the spool moves to the closed position, the forces reverse from vertically downwards to vertically upwards. It is at this time the spring 60 starts to work as a compensating force to prevent closure until set pressure is reached.

This profiling of the spool has distinct advantages when the valve is used as a relief, as shown in FIG. 5, in that the curvature on the spool in conjunction with the tubular seat creates an ever-increasing annular orifice which in the early stages of opening, is quite small and consequently, gives the valve stability even at low flows.

The use, operation and function of the invention probably may best be understood with reference to FIGS. 5–13 in which the valve has been shown in a schematic form and simplified for purposes of illustration. The invention is primarily intended for use in valving for high pressure water, which make such a valve different from oil valving. The problems are brought about by the difference in water as a hydraulic fluid versus oil as the fluid. Water has little or no lubricity, very poor bearing load capability and is difficult to seal because of its extremely low viscosity. In addition, water in combination with atmospheric conditons is quick to cause rusting and corrosion on the standard ferrous materials used in oil valves. This necessitates the use of anti-corrosive materials such as stainless steel. In applications such as pressure relief or pressure reducing, the control of the pressure is achieved by creating high velocity at the valve so as to destroy some of the energy in the fluid. The velocity has a relationship with the pressure and the higher the pressure, the greater the velocity. This velocity has a highly erosive affect, so material of high hardness to counter this affect should be used.

The function of a pressure-reducing valve is to accept fluid at a high pressure and deliver it to another part of the system at a lower pressure. The problem facing the designer of a valve-controlling high pressure water is referred to as "velocity erosion." A pressure reducing valve accomplishes this difference by restricting the flow passages through the valve in such a way that a portion of the system's pressure is used to force the fluid through. If the amount of restriction is increased, the amount of difference between inlet and outlet pressures will also increase, which is normally referred to as "pressure drop" across the valve.

Pressure drop varies with fluid velocity, but not in direct proportion. It varies with the square of fluid velocity. There are other factors involved, but for a particular set of conditions, they may be considered constant. For example, if the pressure drop through a valve was say, 50 pounds per square inch and the velocity of the fluid at this pressure drop was 30 feet per second, then if the pressure drop is increased by adjustment of the valve to, say, 2,000 pounds per square inch, the fluid velocity would increase to approximately 350 feet per second.

It can therefore be seen that velocities through a reducing valve are going to be high, higher than through other types of valves, such as directionals, checks, bypass valves, etc. High velocity through a reducing valve becomes critical in a water valve due to the low lubricity of water which, at high velocity, has the characteristic of eroding the restriction away. The restriction in a reducing valve is usually created or caused by a tapered spool taking up a predetermined position in a matching hole in the valve body. Even though the spool and seat or restriction may be made from hardened steel, it will still erode rather rapidly because of the wire drawing affect of the water. The service life of such a valve can be markedly increased if the pressure drop across the tapered spool and seat itself can be perceptively reduced.

The present invention provides a variable orifice which is in the form of an insert, designated 114 in FIG. 5, which, when properly adjusted, provides a fixed pressure drop in series with the spool itself. The insert is not self-compensating during operation. Its function is to create a pressure drop close to, but not quite, the amount required across the whole valve. The remainder of the pressure drop is then taken by the spool during valve operation.

The variable orifice 114 is in the nature of a hardened rod screw-threaded at one end and drilled at the other. It provides a snug fit into the passageway of the valve and a number of holes may be cross-drilled at the end, all the same size, or of varying sizes, so that when the orifice is fitted into the valve body, one or more of the radial holes will control the flow through the valve block. The orifice may be turned and possibly the outside of the housing may be graduated so that it can be accurately set to provide for the desired restriction. The passageway is of sufficient size that rotation of the orifice in its screw threads will still allow any other radial holes to line up to control the flow.

The sizing of the radial holes should be such that a pressure drop is created of, say, about 400 psi, less than required across the valve body. By restricting the pressure drop across the spool to no more than, say, 400 psi, the velocities are held down to below, for example, 150 feet per second, a speed which can be handled without undue erosion of the spool. The maximum pressure drop is maintained irrespective of the total pressure drop requirement. Thus the spool's work will be the same whether reducing from, say, 3,000 psi to 500 psi or from 1,000 psi to 600 psi.

By providing the screw threads on the orifice, adjustments can be made so that less than a complete radial hole will match up with the valve passageway. If desired, portions of two radial holes may be used to form the required orifice.

In any event, the orifice is specifically designed and constructed to create most of the pressure drop requirement. The orifice will wear, but it can be adjusted to compensate for wear from time to time and, if it eventually wears out, it can be easily removed and replaced at considerably less expense than the spool and seat. The basic purpose of the orifice is to work in series with the valve spindle so that the pressure drop, and therefore the velocity, across the spindle will not be as high as when the spindle is the sole controlling feature. Any number of radial holes in any sizing may be used in the orifice.

One of the important features of the invention is that the breakdown orifice 114 provides accuracy in control by the main valve element since it will not be subject to the erosive effects it would otherwise be afflicted with. Prior to this invention it has been very difficult to maintain the constancy of the spool configuration which is necessary for predictability and controllability. The breakdown orifice in the passageway downstream from the valve seat will accomplish this. While the breakdown orifice will suffer the erosive effects of the high velocities, it will not have the same effect on controllability, service life or economics. Controllability is achieved essentially as the spool closes toward its pre-set condition so that, for example, the first 90 percent of the pressure drop can be achieved by the breakdown orifice. The orifice itself is small and is a static element. It is therefore not costly as compared to the spindle and seat. Because it is small it is also feasible costwise to use tungsten or a similar extremely hard material to extend its service life which is impractical costwise for the major and larger elements, such as the spool and seat.

The pressure breakdown orifice has the advantage that it is an insertable device, easily accessible from the exterior of the valve body without disturbing the valve assembly. It may have a number of different diameter orifice holes, each permitting different magnitudes or ranges of pressure drops. Selection of these various ranges of pressure drops can be made externally by rotating the insert. Further, as erosive wear takes place, the orifice can be rotated to compensate for wear.

In FIG. 5 the valve body has been shown with certain arrows below it indicating certain operating conditions, with FIGS. 6–13 schematically illustrating certain conditions. The pilot relief valve 68 may be used or it may be removed and its ports in the upper housing blocked. The same is true of the solenoid-controlled two-way selector valve 86. It may be used or removed and its ports blocked. All of this depending upon the function and application desired for the main valve.

At the start of operations with the unit set up and arranged as a reducing valve, the valve would be as shown in FIG. 1 with the main spool 40 pushed down into the lower block 14 by the spring 60 so that it is taking up a fully open position for maximum flow. The pilot valve 68 would be closed, with the valve element 74 on its seat 76. The solenoid controlled selector valve 86 would also be closed with its valve element 90 on its seat.

Fluid enters the valve at the inlet port 24, through passageway 26, into the cross passageway 28, down through the annular passageway formed by the spool 40 and the tubular seat 58, into the counterbore 32 in the lower body 14, through the drilled axial passage 116 in the variable orifice 114, out through one of the radial holes 118 in the variable orifice, into the outlet passage 36, and out through the outlet port 38 to the device to be operated.

The area through the radial hole 118 is small compared with the areas through the rest of the passageways, and consequently a pressure drop of some magnitude will occur at this point. Thus, the pressure on the downstream side, i.e., the outlet side, will be lower than the inlet or upstream side.

The reduced pressure also enters cross passage 100. Plugs are fitted at 102 and 104, preventing flow in these directions. The fluid can act on the bottom of the spool 40 and also through cross passage 105, FIG. 4, the fixed orifice 106, up through the vertical passage 108, the fixed orifice 110, the vertical passage 111, the horizontal passage 112 and into the chamber 46 to act on the top of the spool 40. From the chamber 46 a cross passage 84 leads, via passage 82, to the lower portion of pilot valve seat 76 and acts against the valve element 74. Another passage 85 leads from the chamber 46, to the chamber 88, in the solenoid valve 86, and acts on its valve element 90.

Thus, the conditions are that flow is occuring from inlet to outlet; equal hydraulic pressures are acting on both the top and bottom of the valve spool 40, and hydraulic pressure is acting to open the pilot valve element, and the solenoid valve element. The spring 72 and the solenoid are preventing the opening of these elements.

Flow continues from the outlet port to the device being operated, and as resistance is felt on the device, pressure begins to increase on the downstream side of orifice 114. It is, of course, lower than the upstream side.

This increase in pressure, is also acting on the pilot valve element 74, and the spring 72. When the pressure has risen to a predetermined value, the force below the valve element overcome the force created by the spring, and the valve element is moved off its seat 72, allowing pressure, acting on top of the spool, to drain away via passages 84 and 82 through the pilot valve and out through passage 77, to a suitable reservoir. This causes a state of hydraulic unbalance on the valve spool 40, which starts to move in an upward direction and, because of the spool profile, thereby creates a reduction in annular area between spool and seat. This reduction in area or orifice, causes a pressure drop, and this pressure drop will increase until the combination of it, and the pressure drop across the orifice 114, equal the system requirements. The spool will hold in this new position until there is a drop in pressure downstream from the valve outlet 38. When this occurs, there will be a similar drop in pressure in the various pilot passages inside the valve, and the spring force on the pilot relief 68 will overcome the hydraulic forces on the valve element 74, causing it to close, and once more allowing downstream pressure to build up on top of the spool 40, so that it is again in hydraulic balance. Because of the spring 60, the spool will tend to move downwards on open. This increases the annular area between spool and seat, and therefore, reduces pressure drop until downstream pressure reaches system requirement, when the whole process is repeated.

In practice, the spool does not move up and down as separate discernable motions, but instead modulates rapidly with very small amplitude, so that it maintains system requirements.

The fixed orifices 106 and 110, are so sized that they control the rate of flow to the pilot valve element 74, in such a way that the valve will open sufficiently to remain stable, and relieve at a constant pressure. This is important, because if the relieving pressure varied, these variations would be transmitted to the top of the main spool, and cause increases in the amplitude of spool modulation. The effect of this would be to vary the pressure drop between spool and seat, and therefore, prevent controlled pressure reduction.

Variations in the amount of reduction can be achieved by selecting the correct orifice hole 118, in the variable orifice 114, for the majority of the pressure reduction, and completing the final reduction, by adjusting the handwheel 70, so as to vary the spring load on the valve element 74.

The function of the solenoid valve 86 is to enable the reducer valve to have a remote control. This remote control will be similar to the pilot relief valve 68. It should, however, have a lighter spring than the one in the relief valve.

Whenever the solenoid valve is open hydraulic fluid can pass from the upper chamber 46, through passage 85, into chamber 88, passed valve element 90, into passage 96, and out of the valve via passage 126.

The valve would function in the same way as described earlier, except final adjustment to the reduced pressure would be made on the remote pilot relief valve.

Closing of the solenoid valve would insolate this remote relief valve and control of pressure reduction would revert to the pilot relief valve mounted on the main reducer valve.

Operation of the valve as a relief is similar, except that in this case the main spool 40 is inverted, and in conjunction with the seat 58, forms a positive shut-off of flow until set pressure is reached, at which time the spool lifts off its seat, and permits flow through the valve to some convenient reservoir. The spool will stay open until system pressure drops below the valve setting, when it will then close against the seat and once more give positive shut off.

In this case, set pressure is controlled entirely by the pilot relief valve 68, and a variable orifice is not used.

In FIG. 6 the valve function is schematically indicated with the pilot relief valve 68 applied, solenoid valve 86 removed and its ports blocked, and the spindle in the position shown in the valve housing in FIG. 5. As shown in FIG. 5, there are several alternates for the various pilot lines. For example, the pilot relief 68 may be vented through line 78 to the discharge side of the valve spindle or it may be through an external drain, as at 77. In the FIG. 6 schematic the valve is set up as a relief valve without the pilot selector valve 86.

In the FIG. 7 schematic the arrangement has been shown for a relief and unloading valve with both the selector valve and pilot relief valve in place, with the selector valve normally closed. The drain from solenoid valve 86 may be internal as shown at 98, or it may be through an external drain 126 to a remote pressure control.

The schematic of FIG. 8 varies from FIG. 7 in that the selector valve is normally open.

FIG. 9 shows a variation in which the pilot relief valve 68 has been removed, its ports blocked, and the solenoid selector valve 86 is used so that the valve housing now is a two-way valve that is normally closed.

The FIG. 10 schematic is the alternate of this, namely a two-way valve that is normally open.

In all of the above the spindle 40 will be disposed as shown in the valve housing in FIG. 5, with 38 being the inlet and 24 the outlet.

FIGS. 11–13 vary from FIGS. 6–10 in that the spindle is reversed, turned end-for-end and reinserted into the housing so that it is disposed as shown to the left in FIG. 5, which makes 24 the inlet and 38 the outlet, making the unit a reducing valve. FIGS. 11–13 illustrate pressure-reducing valves with various combinations of the pilot relief and solenoid selector valves. In FIG. 11 the pilot relief 68 is used but the selector valve is not, with the valve itself being normally open.

In FIG. 12 the selector valve 86 is used and is normally closed, while in FIG. 13 both the pilot relief and the selector valve are used, with the selector valve normally open. In all three of these Figures the valve is arranged and constructed to function as a pressure-reducing valve.

One of the advantages of the invention is that a series of passages has been developed and patterned so that the second stage pressure relief, solenoid venting, remote unloading and remote control for the valve function can be used as attachments so that the valve function may be changed without disturbing the valve body or housing configuration itself.

Additionally, the undersurface of the valve body is designed and prepared for either manifold type mounting or the attachment of flanges in a manner permitting the inlet and outlet which allows for an "in-line" connection.

While the preferred form and a number of variations have been shown and suggested, it should be understood that numerous additional modifications, changes, substitutions and alterations may be made without departing from the inventor's fundamental theme.

The embodiments of the invention in which an exclusive property or privilege is claimed are defined as follows:

1. In a pressure reducing valve system, a valve body with a main passage therethrough having an inlet and an outlet, a main orifice and valve element operative relative thereto to accomplish a certain amount of pressure reduction, and a separate flow restrictor in series with the main orifice and valve element designed and constructed to effect a fixed amount of pressure reduction, the majority of the desired pressure reduction being effected by the separate flow restrictor with the remainder being effected by the main orifice and valve element.

2. The structure of claim 1 further characterized in that the separate flow restrictor is in the form of an insert which is fitted in a side passage in the valve body in communication with the main passage.

3. The structure of claim 2 further characterized in that the inner portion of the restrictor insert has a variable orifice, and further including means for adjusting the position of the restrictor insert from the exterior of the valve body so that the degree of pressure reduction effected by the restrictor insert may be varied and also compensation for wear may be effected.

4. The structure of claim 3 further characterized in that the inner portion of the restrictor insert has a main central passage with a plurality of openings through the sides thereof so that the effective cross-sectional area allowing flow through the main passage may be varied by adjustment of the restrictor insert.

5. The structure of claim 4 further characterized in that the passages of the plurality vary in size.

6. In a valve housing unit, a main passage therethrough with a restriction in the passage capable of functioning as a valve seat and as a flow-restrictor, openings at each end of the passage to serve either as an inlet or an outlet, and a combination spindle in the passage cooperating with the restriction to provide either a valve-closing function or a restricting function, the spindle having spaced cylindrical portions along the length thereof, a valve seat between the cylindrical portions and adjacent one of them, and a contoured surface adjacent the seat shaped to function as a pressure regulator when the spindle is in one position as part of a relief valve and as a pressure reducer when the spindle is reversed end-for-end as part of a pressure reducing valve.

7. The structure of claim 6 further characterized by and including a separate flow restrictor in the passage in series with the restriction and spindle designed and constructed to effect the balance of the desired pressure reduction when the unit is functioning as a pressure reducing valve.

8. The structure of claim 6 further characterized by and including a plurality of internal and external pilot feeds and drains constructed and arranged to cooperate with a pilot relief valve and/or a selector valve or to be blocked off so that the unit may be made to function as a pressure relief valve, a pressure reducing valve or an unloader valve.

9. A combination valve housing unit with a pressure reducing function and a pressure relief function having a main passage with openings at each end usable as an inlet and outlet, a spindle and seat in the passage constructed so that the spindle cooperates with the seat to form an orifice which, when the spindle is in one position, it performs a closing function as a relief valve, and when the spindle is turned end-for-end it performs a pressure reducing function, and a separate removable restrictor in the main passages in series with the spindle, the separate restrictor accomplishing a portion of the pressure reduction and the orifice formed by the spindle and the seat accomplishes the balance of the reduction.

10. The structure of claim 9 further characterized in that the orifice formed by the spindle and seat presents a variable orifice contour as the spindle has a variable profile adjacent to the seat and is shaped to function as a pressure regulator when the spindle profile relative to the seat is in one position as part of a relief valve and as a pressure reducer when the spindle is reversed end-for-end as part of a pressure reducer valve in which the variable spindle profile relative to the seat reduces a portion of the pressure and the separate restrictor in series with the spindle reduces another portion.

11. The structure of claim 10 is further characterized in that the separate restrictor in series with the spindle includes a plurality of various sized orifices which regulate the major portion of the pressure reduction, while the orifice formed by the spindle and the seat regulates the minor portion of the pressure reduction, thus allowing lower fluid velocity across the spindle and seat to thereby prolong the life of the spindle and seat.

12. The structure of claim 11 further characterized in that the separate flow restrictor is in the form of an insert which is fitted in a side passage in the valve body in communication with the main passage.

13. The structure of claim 12 further characterized in that the restrictor includes means for adjusting the position of the restrictor insert from the exterior of the valve body so that the degree of pressure reduction effected by the restrictor insert may be varied and also compensation for wear may be effected.

14. The structure of claim 13 further characterized in that the inner portion of the restrictor insert has a main central passage with a plurality of openings through the sides thereof so that the effective cross-sectional area allowing flow through the main passage may be varied by rotary adjustment of the restrictor insert.

15. The structure of claim 14 further characterized in that the passages of the plurality vary in size.

* * * * *